July 3, 1923.

F. G. WHITTINGTON 1,460,521

TRANSMISSION DRIVE FOR MOTOR VEHICLE INSTRUMENTS

Filed March 17, 1922    2 Sheets-Sheet 1

Witness:

Inventor:
Frederick G. Whittington,
by Burton & Burton
his attys.

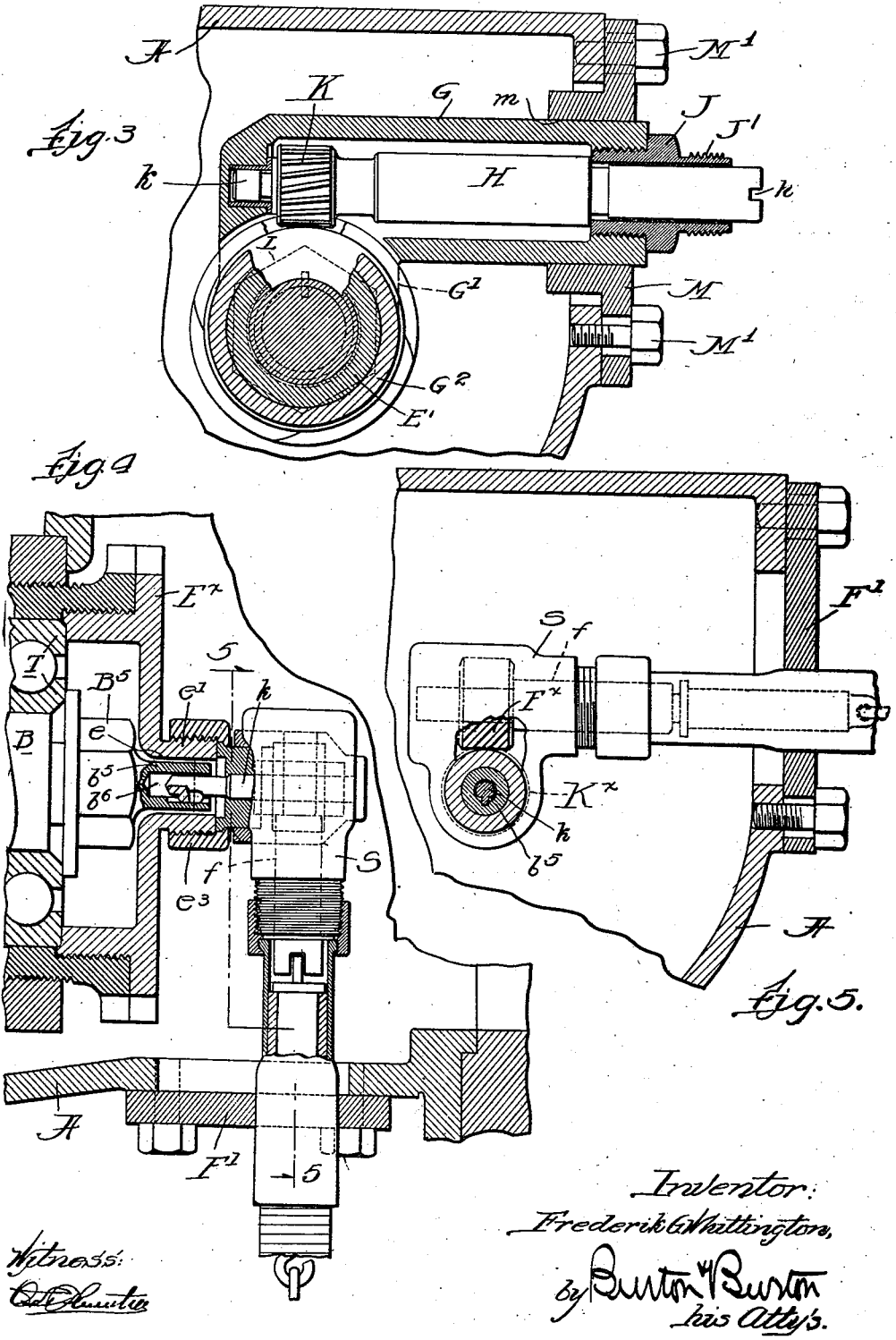

Patented July 3, 1923.

UNITED STATES PATENT OFFICE.

FREDERIK G. WHITTINGTON, OF EVANSTON, ILLINOIS, ASSIGNOR TO STEWART-WARNER SPEEDOMETER CORPORATION, OF CHICAGO, ILLINOIS, A CORPORATION OF VIRGINIA.

TRANSMISSION DRIVE FOR MOTOR-VEHICLE INSTRUMENTS.

Application filed March 17, 1922. Serial No. 544,648.

*To all whom it may concern:*

Be it known that I, FREDERIK G. WHITTINGTON, a citizen of the United States, having residence in Evanston, in the county of Cook and State of Illinois, have invented certain new and useful Improvements in Transmission Drives for Motor-Vehicle Instruments, of which the following is a specification, reference being had to the accompanying drawings, forming a part thereof.

The purpose of this invention is to provide an improved construction of transmission drive for motor vehicle instrument. It consists in the elements and features of construction shown and described, as indicated in the claims.

In the drawings:—

Figure 3 is a section at the line, 3—3, on Figure 2.

Figure 4 is a view similar to Figure 1, showing a slightly modified construction.

Figure 5 is a detail section at the line, 5—5, on Figure 4.

Figure 2:
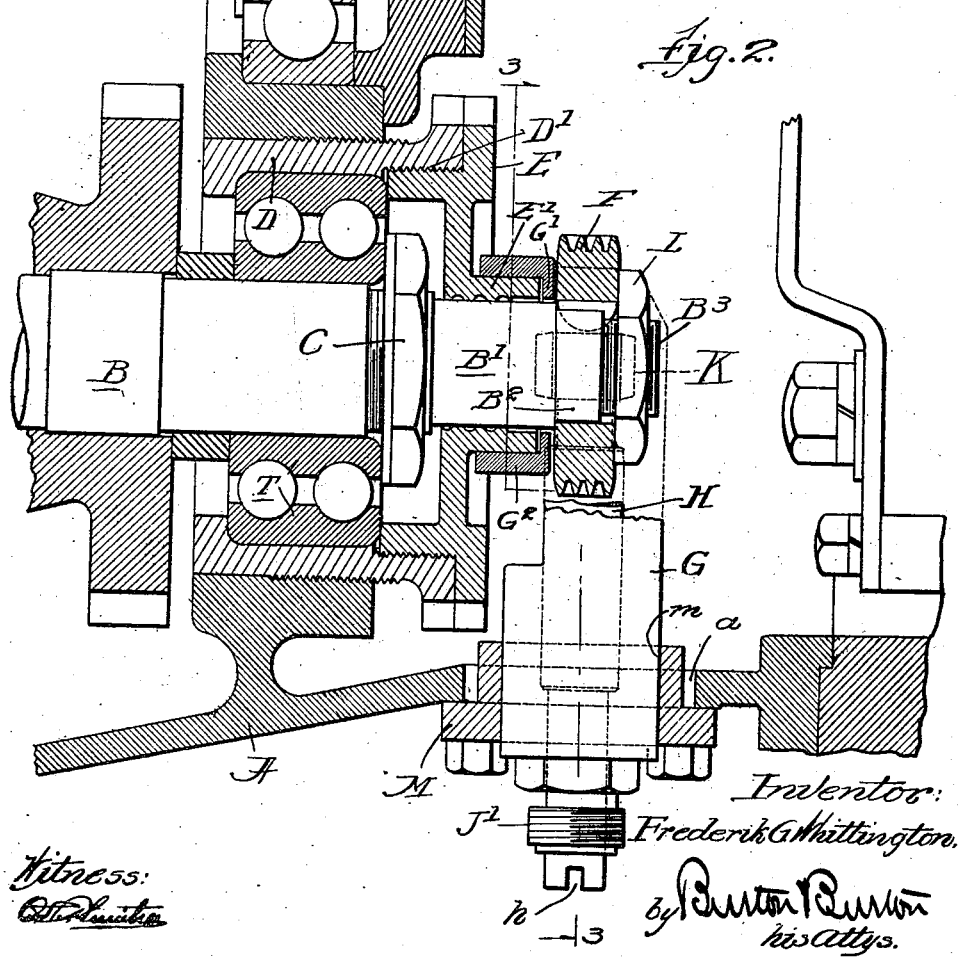
Figure 2 is a vertical section, axial with respect to the power shaft shown therein, through the transmission casing of a construction equipped with this invention.

In the construction shown in the drawings, the transmission case is shown at A, having the forward end of the propeller shaft B, exposed at the forward end of the casing, except for the supplemental enclosing housing members hereinafter described. In the form shown in Figure 2, the propeller shaft is provided with a stop nut, C, for which the propeller shaft is slightly reduced and threaded where it protrudes beyond its forward bearing in said casing. The bushing sleeve, D, which carries the ball bearing, T, for said propeller shaft protrudes from the forward end of the casing, and is interiorly enlarged and threaded at $D^1$, to receive the supplemental housing member, E, which is in the form of a cap exteriorly threaded for screwing into the bushing sleeve, D, and which is centrally apertured for the exit through it of the forward end of the propeller shaft, which is reduced as shown at $B^1$, for thus extending through the center of said supplemental housing; and beyond its bearing at $B^1$, in the hub, $E^1$, of said supplemental housing, E. said shaft, B, is further reduced at $B^2$, to receive the spiral gear, F, hereinafter more particularly described, at said reduced portion, $B^2$; and is further reduced and threaded at $B^3$, to the end of said shaft. G is a hollow coupling member in which there is journaled a driven shaft, H, the journal bearing at one end being provided in a bushing, J, which is screwed into the otherwise open end of the housing, G, the aperture into which it is thus screwed being large enough to admit the spiral pinion, K, also mounted upon the other end of said driven shaft, H, and said other end of said shaft is reduced and obtains a journal bearing at $k$ in the end of the housing, G, opposite that which has the journal bearing bushing J. Extending off at right angles from said main portion of the housing, G, it has an integral web, $G^1$, from which there is extended an annular flange, $G^2$, which constitutes a cap or cup member for fitting outside the hub, $E^1$, of the supplemental housing, E, the fit being close but not so tight but that the parts can be applied by hand and without drive. For assembling the parts the said spiral gear head is placed in mesh with the pinion, K, lodged against the web, $G^1$, and the annular flange or cap, $G^2$, is then advanced onto the hub, $E^1$, of the supplemental housing, E, while the spiral gear, F, is advanced onto the reduced portion, $B^2$, of the shaft, B, where it may be keyed fast and further secured by screwing a nut, L, onto the reduced threaded end portion, $B^3$, of the shaft, B. For permitting the assemblage of the parts in the manner described, there is provided in the transmission casing shell forward of the plane of the supplemental housing, E, an aperture, a, large enough to admit the entire assemblage comprising the casing, G, with the two intermeshed gears. The closure plate, M is applied over the opening, a, and secured by bolts, $M^1$, said closure plate having an aperture, m, in which the housing, G, makes a slip fit, so that said closure plate serves merely to position and retain the member, G, against otherwise free rotation about the axis of the shaft, B. The bearing bushing, J, for the outer end of the driven shaft, H, is provided with an exteriorly threaded terminal, $J^1$, adapted to receive the customary interiorly threaded terminal of the casing of a flexible shaft, and the outer end of said shaft, H, is suitably notched as shown at $h$, for driving connection with the rotary member of the flexible shaft; and such shaft shown conventionally at O and P, may be extended in whatever direction and for whatever distance it may be necessary to reach the speedometer or other instrument which is driven, mounted on the dash board or elsewhere upon the vehicle.

Figure 1:
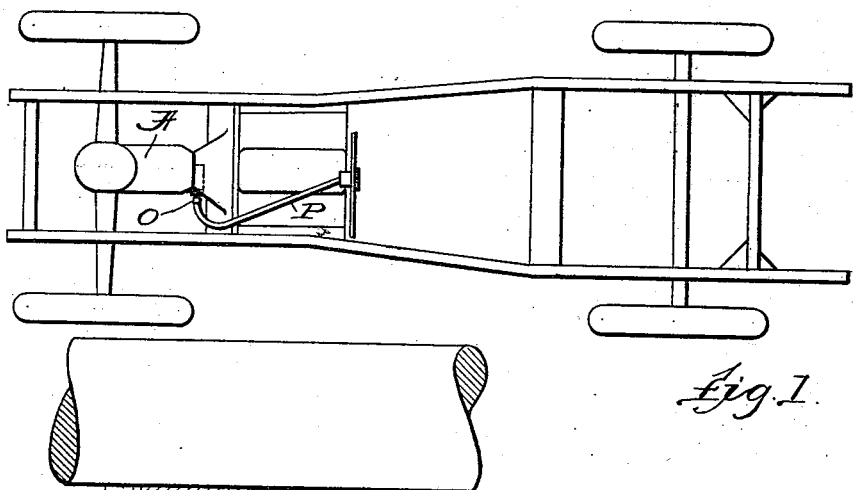
Figure 1 is a diagrammatic view of the chassis of an automobile which is equipped with a construction embodying this invention, for showing the position of the same relative to the motor and transmission.

In the form shown in Figures 4 and 5, the spiral gears, $F^x$ and $K^x$, are completely enclosed in a fixed or rigid housing, S, with their shafts, $f$ and $k$, protruding at an acute angle from the housing, the supplemental housing corresponding to the housing, E, of Figure 1, designated $E^x$ in Figure 4, has a central aperture, $e$, and a protruding terminal annular boss, $e^1$, exteriorly threaded; and the casing, S, is terminated around the bearing through which the shaft, $k$, emerges, with a swiveled interiorly threaded coupling cap, $e^3$, adapted to be screwed onto the exteriorly threaded terminal, $e^1$, of the housing, $E^x$. The propeller shaft, B, in this form is terminated with a nut, $B^5$, which constitutes an endwise stop for the shaft against the ball-bearing casing, T, and this nut has a terminal, $b^5$, which is reduced in diameter for free entrance into the hollow hub or boss, $e^1$, of the housing, $E^x$, and which is in turn axially bored, as shown at $b^6$, to receive the reduced end of the shaft, $k$, in driving engagement with said terminal, $b^5$, the said shaft, $k$, being adapted for entering into driving engagement with the terminal, $b^5$, as it is advanced thereinto, screwing on the swivelled coupling cap, $e^1$. The hand-hole plate, $F^1$, is applied and secured in the same manner as already described in respect to the structure of Figure 1.

I claim:—

1. In a motor vehicle having a transmission casing at the rear of the motor, and a longitudinal propeller shaft of which the forward member is journaled in the transmission casing and is exposed at the forward side thereof; a supplemental housing member applied onto the forward side of the transmission casing around the exposed end of said propeller shaft member; a pair of intermeshed driving and driven spiral gears and a casing within which they intermesh, the margin of the opening in the supplemental housing and the spiral gear casing having the one a male and the other a female terminal adapted for engagement to close the opening in the supplemental housing, and means for engaging the driving gear of said pair with the propeller shaft when said terminals are engaged.

2. In the construction defined in claim 1, foregoing, the spiral gear casing comprising an arm which extends transversely to the axis of the driving gear of the spiral gear pair, and means adapted to be fixed with respect to the transmission casing for positioning said arm as to its direction radially of the propeller shaft.

3. In the construction defined in claim 1, foregoing, the spiral gear casing being constructed to enclose both the spiral gears, the driving gear of the pair having a shaft which protrudes from said casing, the terminal for engagement with the supplemental housing terminal being rotatably connected with the remainder of said spiral gear casing, said engaging terminals of the housing and casing being threaded for their engagement by the rotation of the spiral gear casing terminal.

4. In a motor vehicle having a transmission casing at the rear of the motor and a longitudinal power transmitting shaft journaled in said casing and exposed at the forward side thereof; a pair of intermeshing gears whose axes are in planes transverse to each other, a housing for said gears having two transversely positioned members adapted to be secured by one of said members to the transmission casing at the forward side thereof in the rear of the motor with the gear in said member in driving engagement with said power transmitting shaft, and means for positioning the other transverse member of said housing on the transmission housing with its end and the end of the shaft member therein exposed for connection respectively with the casing and rotary element of an encased flexible shaft.

In testimony whereof, I have hereunto set my hand at Chicago, Illinois, this 11th day of March, 1922.

FREDERIK G. WHITTINGTON.